May 23, 1950 W. A. MARRISON 2,508,526

TELEPHONE SIGNAL TRANSMITTER

Filed Dec. 5, 1947 3 Sheets-Sheet 1

INVENTOR
W. A. MARRISON
BY J W Schmied
ATTORNEY

May 23, 1950 W. A. MARRISON 2,508,526

TELEPHONE SIGNAL TRANSMITTER

Filed Dec. 5, 1947 3 Sheets--Sheet 2

INVENTOR
W. A. MARRISON
BY
J W Schmied
ATTORNEY

May 23, 1950 W. A. MARRISON 2,508,526

TELEPHONE SIGNAL TRANSMITTER

Filed Dec. 5, 1947

3 Sheets-Sheet 3

INVENTOR
W. A. MARRISON
BY
J. W. Schmied
ATTORNEY

Patented May 23, 1950 2,508,526

UNITED STATES PATENT OFFICE 2,508,526

TELEPHONE SIGNAL TRANSMITTER

Warren A. Marrison, Maplewood, N. J., assignor to Bell Telephone Laboratories, Incorporated, New York, N. Y., a corporation of New York Application December 5, 1947, Serial No. 789,881

12 Claims. (Cl. 177—380)

This invention relates to signal transmitters and more particularly to a selective signaling transmitter in which the selectivity is obtained by sending coded pulse signals simultaneously over a plurality of different frequencies.

A feature of the present invention is a signal transmitter which can transmit in a simple manner a far greater number of different signal combinations than transmitters now in use.

Another feature of the present invention is a transmitter composed of a number of simultaneously operating generators, with each generator operative at a different frequency.

A further feature of the invention is a transmitter in which pulses having different combinations of time relationship to each other may be obtained from the generators and combined to form a composite signal.

Still another feature of the subject invention is a signal transmitter in which the code to be transmitted may be selected merely by rotating discs before the transmitter is operated.

A still further feature of this invention is a signal transmitter with visual means for indicating the code that is transmitted.

Another feature of the subject invention is a signal transmitter which transmits, along with its coded signal, a distinctive signal for identifying itself as the calling transmitter.

A still further feature of the present invention is a transmitter in which a warning signal is first transmitted to indicate that the coded signals are about to follow.

Other features of the present invention will become apparent from the following detailed discussion, when taken in conjunction with the accompanying drawings.

In accordance with the subject invention, a selective signaling transmitter is contemplated which will be able to send out millions, if not billions, of different signal combinations. This is effected by means of a number of generators which revolve at the same rate because connected to the same shaft, but which have different frequencies as a result of the fact that their stator pole elements have a different number of notches cut in them. Each generator is equipped with at least one set of adjustable stator pole elements containing a number of stators in each set and these adjustable stators are normally positioned so that they will have no influence on the rotors when the rotors turn. However, if two of the stator poles in each set are moved towards the rotor so as to induce a current in the rotor winding as the rotor turns, a distinctive code signal may be obtained from each set of stators. By combining the code signals from all of the sets of stators on the generators, it may be seen that an extremely great number of possible signal combinations may be obtained. The combinations are distinctive because as the generator rotates all of the individual code signals being transmitted at one time have different frequencies and these are in turn followed by other groups of code signals which, although having the same frequencies as the individual code signals in the first group of transmitted signals, are nevertheless distinguishable from these signals by the separation in time.

The particular combination of adjustable pole elements in a set that are positioned close to the rotor is determined by the rotary position of a coded disc. This disc has irregularities extending around its periphery in such manner that no matter how the disc is turned some combination of two stator pole elements will be selected to move towards the rotor. The disc is turned to the correct position before the transmitter starts to operate by rotating cylinders coupled to the discs, the rotation of the cylinders being facilitated by the fact that the cylinders extend above the transmitter chassis partially protruding through slots cut in the cover. Coded identifications are provided on the periphery of the cylinders so that a particular identification can be selected when the identification can be seen from a point directly above the cylinder. The selection takes place through the action of feeler levers, which are attached at one end to the adjustable pole elements and at the other end are positioned close to the periphery of the code disc. When the transmitter is about to be operated, the feeler levers are actuated to move towards the code disc and make contact with its periphery. A feeler lever which encounters a raised irregularity on the periphery is positioned differently from the other levers which rest in recesses of the code disc. This difference in position results in certain stator elements being located closer to the rotor than other stator elements in the set.

In addition to the pole elements described above, each generator is provided with an additional set of stator pole elements which unlike those described above, are not adjustable in position but are preset. Two of the stator elements from each of these sets are permanently positioned near their respective rotors while the other elements are not. Thus, as the rotors turn, a signal having a constant code indication is obtained from each generator and the combination of these constant signals may serve as an identification for the calling transmitter, provided that each transmitter has a distinctive combination of fixed code signals. Further pole elements may also be provided on the stator of each generator to give a warning indication to the central office, when the generators start to rotate, that a coded signal is about to be transmitted. These pole elements should be arranged to give a signal of a different pattern than those of the calling and identifying signals. For example, whereas two out of each set of pole elements are selected for the calling and identifying signals, a distinctive "start" signal might result if three pole elements in juxtaposition to each other on each generator were positioned near their respective rotors.

Referring now to the accompanying drawings.

Figure 1:
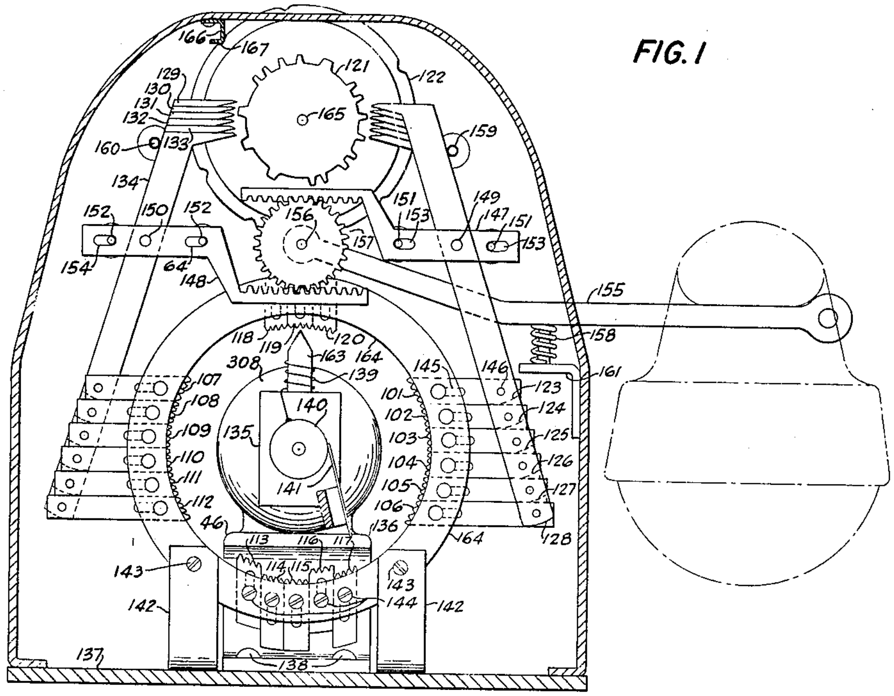
Fig. 1 is a simplified illustration of one of the generators comprising the transmitter, showing the associated mechanisms which operate to prepare the generator for the transmission of a particular code.

In Fig. 1, to which reference is now had, the means are shown whereby coded information is conveyed to the stator pole elements of one of the generators. These means include the adjustable stator pole elements 101 through 112, inclusive, arranged in two sets containing six stator pole elements in each set; the pole elements 113 through 117, inclusive, serving to transmit a signal by which the calling transmitter may be identified; the pole elements 118, 119 and 120 as the means for conveying a "start" signal; the coded disc 121 which is oriented into position for the transmission of a desired signal by revolving the cylinder 122 about shaft 165; and the feeler levers 123 through 134, inclusive, which act to move their respective stator pole elements towards the rotor 135 of the generator 100 so that a desired code signal may be transmitted. The motor 100 is mounted upon the base 136 and this is in turn fastened to the chassis 137 by means of the bolts 138. Since the rotor pole element 163, which is composed of magnetic material is surrounded by a coil 139, a voltage will be induced in the coil as it rotates past any stator pole elements which have been positioned close to the rotor pole 163. After passing through the winding 139 and the slip ring 140 to the brush 141, this generated voltage will appear at the output terminals of the transmitter. The stator ring 164 is also fastened to the transmitter chassis 137 by means of the supporting plates 142, these plates being welded to the chassis 137 at one end and secured to the stator ring by means of the bolts 143 at the other end.

As shown in Fig. 1, four sets of stator pole elements are located around the periphery of the stator ring 164. The bottom of these sets contains the five pole elements 113 through 117, inclusive, with the poles 113 and 116 shown in closer proximity to the axis of rotation of the rotor 135, where they will be magnetically coupled to the rotor pole 163 as the rotor 135 rotates. The bolts 144 serve to clamp the stator poles 113 through 117 in the positions shown. Because of the action of the bolts 144, the two-out-of-five pattern of the bottom set of stator pole elements will remain fixed until changed manually. It may be seen that if each generator comprising the transmitter has five pole elements in its bottom set and two elements out of the five in the set are positioned close to the rotor, a large number of different combinations will exist when the patterns from all the generators in a transmitter are combined. For example, two-out-of-five patterns on a transmitter comprising four generators would yield ten different combinations for each generator and a total of $(10)^4$ or 10,000 different combinations for the complete transmitter. A distinctive combination, then, could serve as the means by which a calling transmitter could be identified. It should be noted that a different number than five pole elements might be used as a set and likewise a different number than two pole elements could be chosen from the set as the basis for distinctive combinations of pole elements. For example, a three-out-of-five combination might be used, and this would again yield 10,000 different combinations if the transmitters were composed of four generators. Or a two-out-of-six combination might yield fifteen different combinations for one generator, and for a transmitter of four generators the total would be $(15)^4$ or 50,625 combinations. Again, if the number of generators were changed, the number of possible combinations would change. As an illustration, a two-out-of-five combination with five generators instead of four would yield ten times as many combinations as with four generators or a total of 100,000 different possibilities.

Although the bottom set of stator pole elements is positioned in a constant relationship for as long a time as the bolts 144 are tight, the two side sets comprising the stator poles 101 through 112, inclusive, are not rigidly clamped by bolts and thus these pole elements are free to move in their slots, as the slot 145 in the stator element 101. These slots are so located that the stator elements are free to move only in a horizontal direction towards or away from the rotor 135. Each of the elements 101 through 112, inclusive, is fastened to a separate feeler lever at the end furthest away from the rotor 135 and it is these levers which push their respective stator elements into position to influence the rotor as it rotates. Thus, for example, the stator element 101 is fastened to the feeler lever 123 by means of the pivot 146; likewise, the feeler levers 124 through 134, inclusive, are fastened to the stator elements 102 through 112, respectively. These levers are also fastened to two rack gears 147 and 148 at a point above their connections to the stator elements, the levers 123 through 128 being fastened to the rack gear 147 and the other levers being fastened to the rack gear 148. The connections are made by shafts 149 and 150, respectively, as will be explained more fully in connection with the discussion of Fig. 3. Like the stator elements, the rack gears 147 and 148 are free to move since they are slotted at the points where the shafts 151 and 152 extend through the gears. When this movement of the rack gears 147 and 148 takes place, certain of the stator elements are moved towards the rotor, as will be described below.

Figure 2:
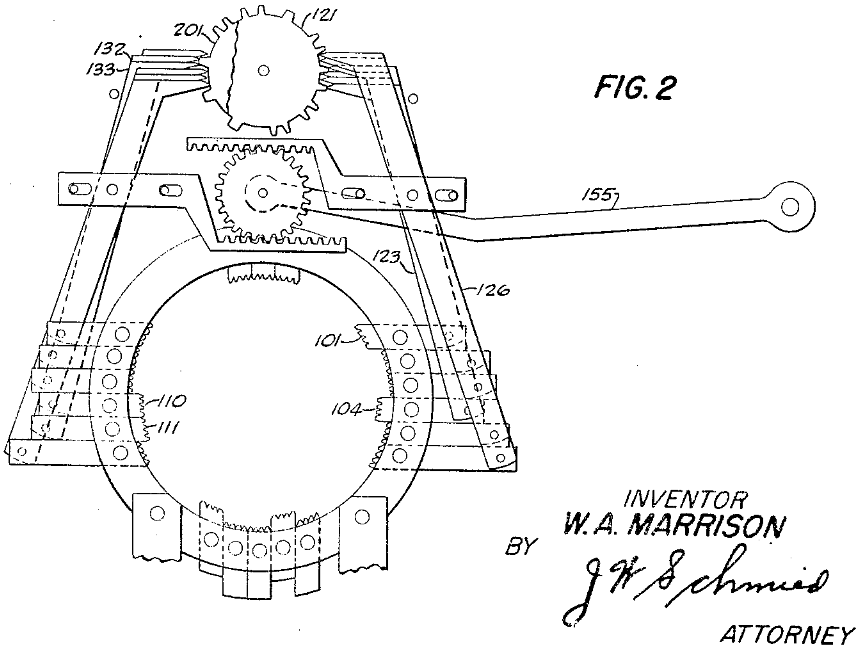
Fig. 2 is a view of the same generator as that shown in Fig. 1 after the associated mechanisms have operated on the generator.

Whereas the feeler levers 123 through 128 and 129 through 134 are fastened at their bottom ends to their respective stator elements, these levers are positioned close to the peripheries of the discs 121 and 201, respectively at their top and, the disc 201 being shown in Fig. 2 by cutting away part of the disc 121. The levers 123 through 128, inclusive, are so constructed that a prong-like feeler extends from each lever to a point close to the disc 121; likewise, a prong-like feeler extends from each of the levers 129 through 134, inclusive, to the periphery of the disc 201, which lies behind the disc 121 so that it cannot be seen in Fig. 1. Thus, when the rack gears 147 and 148 are moved the length of their slots 153 and 154, respectively, the feeler levers are pivoted about the shafts 149 and 150 so that their feelers come into contact with the periphery of the code disc. Wherever a feeler touches one of the raised portions extending out from the periphery of the discs 121 and 201, the stator element associated with the particular feeler lever will be pushed towards the rotor 135, as shown in Fig. 2. Considering the group comprising the levers 123 through 128, inclusive, the reason for this may be seen in the fact that the raised portions of the code wheel cause the selective feelers to adopt a position to the right of the feelers which touch the recessed portions of the periphery and as a result of the lever action of the feeler levers about the shaft 149, the bottom portions of the selective feeler levers will adopt a position to the left of the other levers, thus moving the associated stator elements to the left also. Movement to the left of stator elements in the set comprising the elements 101 through 106, inclusive, results in the elements being positioned near the rotor 135. Fig. 2 shows the feelers on the levers 123 and 126 in contact with raised portions of the disc 121, thus causing the pole elements 101 and 104 to move close to the rotor 135. In like manner, those levers in the set comprising the levers 129 through 134 whose feelers touch raised portions of the code disc 201 will pivot about the shaft 150 and move the associated stator elements towards the rotor 135. In Fig. 2, the levers 132 and 133 touch raised portions on the disc 201, thus causing the stator pole elements 110 and 111 to move close enough to the rotor 135 so as to influence the rotor magnetically as it rotates.

Movement of the rack gears 147 and 148 occurs when the lever 155 is raised. The lever 155 is attached to the shaft 156 so that as the lever 155 moves upward it causes the shaft 156 to rotate in a counterclockwise direction, at the same time turning the gear 157 in a counter-clockwise direction, since the gear 157 is also attached to the shaft 156. The rack gear 147 extends from the pivotal point 149 to a position above the gear 157 and has teeth which engage the top teeth of the gear 157; in like manner, the rack gear 148 extends to a position below the gear 157 and has teeth engaging the bottom teeth of the gear 157. Thus, as the gear 157 rotates in a counterclockwise direction, it causes the rack gear 147 to move to the left, which in turn pushes the feeler levers 123 through 128, inclusive, against the periphery of the disc 121. Similarly, the rack gear 148 moves to the right and pushes the feeler levers 129 through 134, inclusive, into contact with the disc 201 shown in the cut-away view of the discs in Fig. 2. If the signalling transmitter were to be used in connection with telephone work, the lever 155 might come up only when the receiver is lifted from the cradle. Lifting of the lever 155 results from the fact that the spring 158 is in a compressed condition when the lever 155 is in its lowered position and, as soon as the object holding down the lever 155, such as a telephone receiver resting in its cradle, is removed, the spring will expand to its natural length, pushing the lever up with it. The spring 158 is fastened at one end to the table 161, which is in turn supported by the chassis 137, and at the other end the spring is attached to the lever 155. The stops 159 and 160 serve to limit the movement away from the discs 121 and 201 of the feeler levers 123 through 128 and 129 through 134, respectively, when the lever 155 is again lowered. Fig. 2 shows the lever 155 in its raised position and further illustrates how the rack gears 147 and 148 are moved in their slots so that the feeler levers will be made to touch the periphery of the discs 121 and 201. A selective movement of certain of the stator pole elements results, as shown in Fig. 2.

Figure 6:
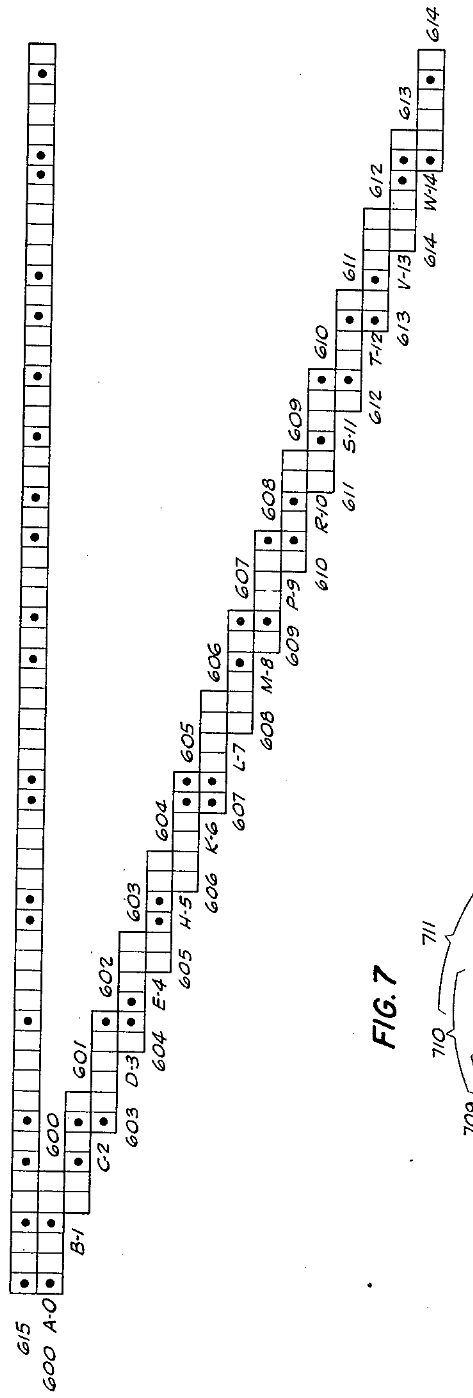
Figs. 6 and 7 show how the different combinations of Fig. 5 might be arranged in an overlapping fashion around a code disc used to prepare a generator for the transmission of a particular code.
Figure 5:
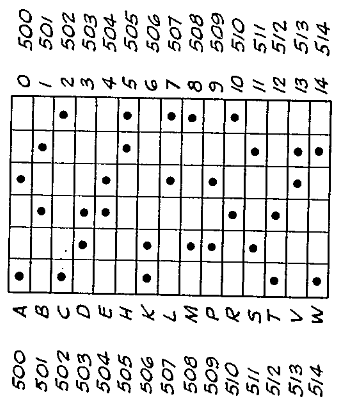
Fig. 5 is a table of the different combinations that may result if a two-out-of-six selection is used as the coded pattern.
Figure 7:
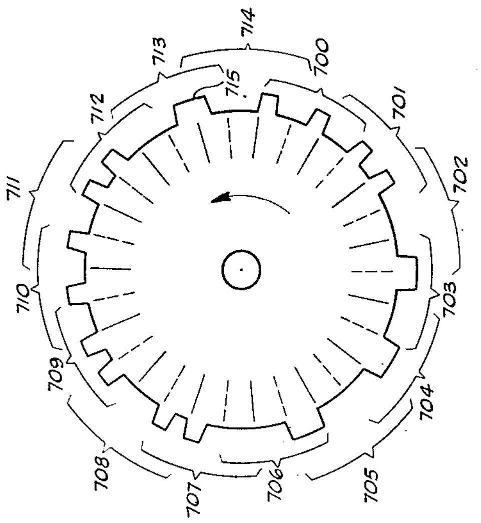

As may be seen in Fig. 1 and also Fig. 7, selection of the particular stator elements to move towards the rotor 135 is determined by the position of the reentrant code discs 121 and 201. Considering the code disc 121, the irregularities on the disc are arranged in a distinctive pattern around the periphery, and a certain pair of the stator pole elements in a group may be selected only when the code disc is rotated to such a position that the feeler levers of the desired pair of stator pole elements touch corresponding raised portions of the periphery. Figs. 5, 6 and 7 illustrate one way in which the raised irregularities may be located around the periphery of a reentrant code disc. Assuming that a two-out-of-six pattern is used to obtain distinctive combinations of the stator pole elements in a set, Fig. 5 shows the fifteen different combinations that may be obtained. In Fig. 5, six boxes are aligned horizontally to correspond to the six individual stator elements in a set and the fifteen rows extending downward show the fifteen possible combinations. Dots in a box indicate that a particular stator element has been selected. Thus, the first row 500 of boxes indicates that a pair of stator elements have been selected which correspond to the elements 101 and 104 in the set comprising the elements 101 through 106, inclusive; similarly, the elements 103 and 105 are the selective poles in the second row 501 of boxes and the elements 101 and 106 will be pushed towards the rotor as indicated by the dots in the third row 502 of boxes. The rows 503 through 514, inclusive, indicate the other combinations in which two of the stator elements in a set may be located close to the rotor. If, now, the periphery of the code disc were to be divided into fifteen equal arcs and each of the fifteen arcs were divided into six smaller segments of equal length, raised portions would have to extend from two of the segments in each of the fifteen equal arcs, with each arc having raised tabs extending from a different pair of segments. Thus a total of ninety segments would have to be provided and thirty raised tabs would extend from the periphery of each disc. If the discs were made small—small enough, for example, to fit into the base of a telephone subset—the tabs might be too crowded to give efficient operation of the disc.

Fig. 6 indicates, however, a way in which sixty segments around the periphery of a reentrant disc could accomplish the same results as the ninety segments which would ordinarily be required. As shown in Fig. 6, this is attained by causing the last two segments of one arc to overlap the first two segments of the next. Thus the last two segments of the arc embracing the combination shown as the numeral 600 would embrace the first two segments of the combination shown as 601 and in like manner, the last two segments of the combination shown as the numeral 601 would embrace the first two segments of the combination shown as the numeral 602. This overlapping of the last two segments of one combination with the first two segments of the next combination occurs for all of the combinations 601 through 614, inclusive, and the resultant pattern is shown as the numeral 615 at the top of Fig. 6. By overlapping the last two segments of one arc on the first two segments of the next arc, the number of segments may be reduced from ninety to sixty and, additionally, the number of raised tabs may be reduced below the thirty that would ordinarily be required. Fig. 6 illustrates that the number of tabs are reduced from thirty to twenty for the arrangement shown.

There are a number of ways in which the different combinations might be arranged around the periphery of a disc. For example, a new arrangement from that shown in Fig. 6 would result if the combination 602 were placed between the combinations 600 and 601 instead of having the combination 601 between the combinations 600 and 602, as illustrated in Fig. 6. Or another arrangement might be effected by placing the combination 602 first, the combination 600 second, and the combination 601 third. No matter what arrangement of the different combinations is used around the periphery of a disc, the periphery would have to be divided into only sixty segments provided that the last two segments of one combination were allowed to overlap the first two segments of the next combination on the periphery of the code disc. Additionally, less than thirty raised tabs would be required on the periphery of a disc regardless of the arrangement employed but the actual number of raised portions required would depend upon the arrangement employed. Instead of overlapping the last two segments of one combination on the first two segments of the next, as shown in Fig. 6, the last three segments of one combination might be made to overlap the first three segments of the next combination. By this scheme, the periphery of each disc would only have to be divided into forty-five segments and the number of raised extensions would be reduced even below that required when two segments overlap.

Fig. 7 illustrates how a disc would appear when the overlapping arrangement of Fig. 6 is used. As shown on Fig. 7, the periphery of the disc is divided into the fifteen equal arcs 700 through 714, inclusive. The overlapping effects are shown by means of the brackets and the positions of the tabs in the arcs are also shown. Wherever two tabs lie next to each other on the periphery of the disc, a single tab of double width is made to appear, such as the tab 715 in Fig. 7.

Although a two-out-of-six arrangement is shown for each of the sets containing adjustably positioned pole elements, other arrangements might be used. Thus, for example, a three-out-of-six arrangement or a two-out-of-seven arrangement or any of a number of other arrangements might be used. With a two-out-of-six arrangement in four generators containing two sets each, however, a total of more than 2,500,000,000 different combinations is possible.

Referring again to Fig. 1, a cylinder 122 is shown as being mounted on the same shaft 165 as the disc 121. This cylinder has fifteen notches cut into its periphery, corresponding to the fifteen different combinations that may be obtained from the two-out-of-six code. Thus, if radii are drawn to two adjacent notches on the cylinder 122, the arc cut off on the disc 121 would be one of the fifteen equal arcs described above, the tabs on the arc giving an indication of one of the fifteen possible combinations. In order that the cylinder will not be rotated to a position such that parts of two adjacent arcs, instead of a complete arc, will be acted upon, a latch 166 extends from the top of the chassis 137. The latch 166 acts as a detent to engage a notch, such as the notch 167, on the cylinder 122, so that a complete arc of the disc will be acted upon by the feeler levers. If now, each of the arcs on the cylinder 122 is numbered or lettered to identify it from the other arcs on the cylinder, a particular arc may be chosen by rotating the cylinder by hand until the numeral or letter corresponding to the particular arc may be seen by looking down upon the chassis 137 from above. A slot is cut in the chassis 137 so that the cylinder may extend above the chassis and thus be manually operated from a position outside of the chassis.

In addition to the stator elements on each generator for sending out a calling signal and the stator elements for sending out a signal to identify the calling transmitter, a set of stator elements is provided on each generator for sending out a start signal. When the transmitter begins to transmit, the start signal will be the first signal to be sent out and will serve as a warning to the various receiving stations that the code signal is about to be transmitted. Since the start signal serves only as a warning signal and is not included in the coded signals for calling a particular station or for identifying the calling station, it should not have the same code pattern as these other signals. Thus, whereas two-out-of-six and two-out-of-five patterns are chosen as the calling and identifying codes, a solid block pattern of three-out-of-three may be chosen to serve as the code for the warning signal. This pattern results from placing three adjacent stator pole elements in sufficient proximity to the rotor so as to be coupled magnetically to the rotating generator pole. Thus, the stator pole elements 118, 119 and 120 shown in Fig. 1 are placed near the rotor 135 to serve as the means for attaining the start signal. As with the pole elements 113 through 117, inclusive, for obtaining the identifying signal, the stator poles 118, 119 and 120 are maintained in fixed position by means of bolts or rivets.

Since each generator is sending out signals simultaneously will all of the other generators comprising the transmitter, and since the two-out-of-six pattern is used for each generator, the pair of pulses sent out by each set of stator elements on a generator would fuse into an indistinguishable jumble of pulses if each generator operated at the same frequency. Different frequencies for the generators of a transmitter are obtained by varying the number of notches, or teeth, on the stator elements of each generator. Because of the fact that the generators are coupled to the same shaft, they will rotate at the same speed and thus the frequencies they transmit will be proportional to the number of notched poles cut into their stator elements on that side of the stator facing the rotor. Thus the stator elements on the generator shown in Figs. 1 and 2 all have five notches cut into them. The stator elements of the other three generators comprising the transmitter shown in Fig. 3 might have 3, 7 and 9 notches respectively, yielding proportional frequencies for the four generators of 3:5:7:9. The notches cause the voltage inducted in the rotor coil when passing a stator element to vary from a maximum value, when the rotor faces a peak between two notches, to a minimum value at the trough of the notch, and this constant variation between maximum and minimum values results in an alternating voltage being induced in the rotor winding 139. Since the four coded signals transmitted at one time all have different frequencies, they may be easily separated at the receiving end. The signals which follow the first group of signals will have the same frequencies as the first group of signals but these signals may be distinguished from the first signals by the elapsed time element between them.

Figure 3:
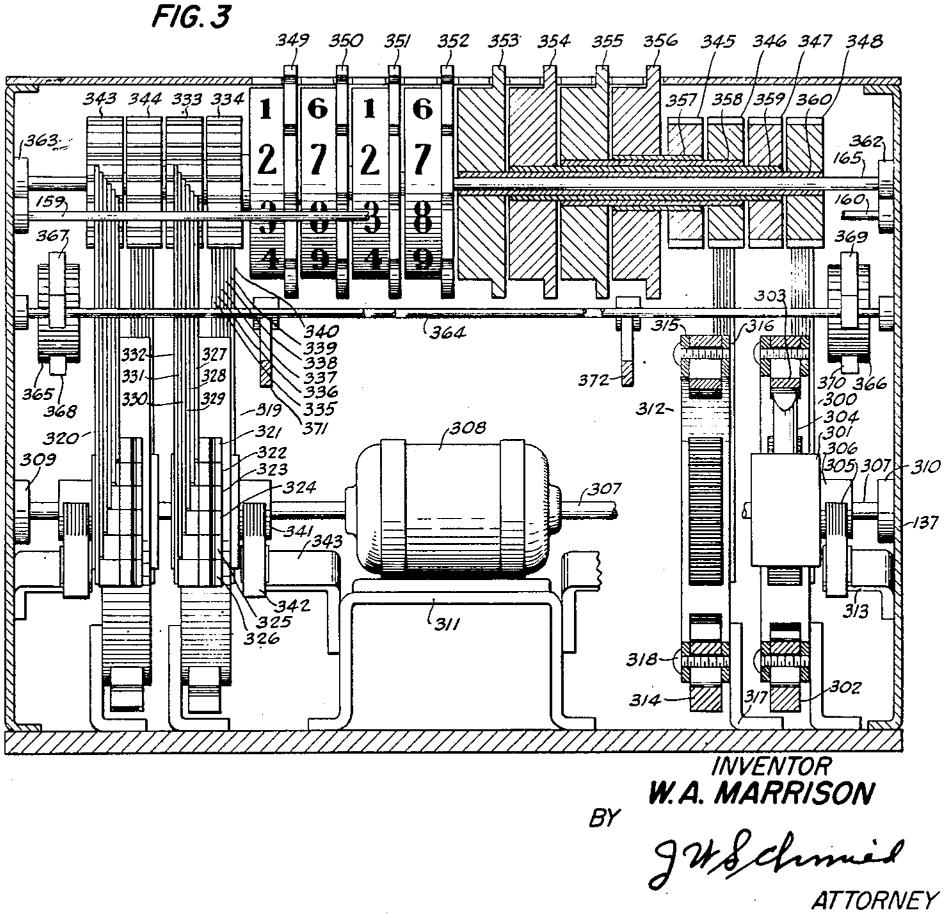
Fig. 3 is a side view with respect to Figs. 1 and 2, showing the relationship of the generators and of the associated mechanisms in the complete transmitter.

Referring now to Fig. 3, which is a front view of the transmitter as opposed to the side views of Figs. 1 and 2, a view is shown of the complete signalling transmitter, which consists essentially of a plurality—four as shown in Fig. 3—of generators similar to the generator described in connection with Figs. 1 and 2. One of the generators, the generator 300 at the bottom right of Fig. 3, is shown with its rotor 301, which is similar to the rotor 135 of Fig. 1. The stator pole elements 302 and 303 are positioned similar to the pole elements 115 and 119, respectively, of Fig. 1, and are magnetically coupled to the pole element 304 on the rotor 301, the pole element 304 being similar to the rotor pole element 163 of Fig. 1. The brush 305 makes contact with the slip ring 306 of the generator 300 because of the action of the bracket 313, which is attached at one end to the chassis 137 and at the other end to the brush 305, serving to hold the brush 305 tightly against the slip ring 306. The rotor 301 is coupled to the shaft 307 as are the rotors of the other three generators shown in Fig. 3 and the motor 308, which drives the generators. The bearings 309 and 310 and the bracket 311, all of which are attached to the chassis 137, help to support the weight of the shaft 307 and the rotors attached to the shaft, the bracket 311 serving as a table for the motor 308.

The generator 312, which is just to the left of the generator 300, although actually constructed in a similar manner to the generator 300, appears different from the generator 300 in Fig. 3 because of the fact that its rotor is not shown. The stator elements 314 and 315 are shown, however, as corresponding to the stator elements 302 and 303, respectively, on the generator 300, and a feeler lever 316 is shown extending down from the disc 346, similar to the disc 121 of Fig. 1, to one of the sets of adjustable stator elements. The stator of the generator 312 is attached to the chassis by means of the bracket 317 and the bolt 318 in a manner similar to the way in which the stators of the other generators are supported.

The generators 319 and 320 in Fig. 3 illustrate the manner in which the adjustable stator elements are located on the sides of the generator stators and further show how the feeler levers extend down from the discs and are fastened to these stator elements. Referring to the generator 319, with the understanding that the generator 320 shows similar features, a set of adjustable stator elements is shown comprising the stator elements 321 through 326, inclusive, these being similar to the stator elements 101 through 106, inclusive, of Fig. 1. A separate feeler lever is attached to each of these stator elements; for example, the feeler lever 327 is attached to the stator pole element 321, thereby controlling the movement of this stator pole, and, in like manner, the feeler levers 328 through 332, are attached to the stator elements 322 through 326, respectively. The feeler levers 327 through 332, inclusive, are similar to the feeler levers 123 through 128, inclusive, shown in Fig. 1 and extend up to a position normally near the periphery of the disc 333, just as the levers 123 through 128 of Fig. 1 lie near the periphery of the disc 121. Other levers extend from a position adjacent to the periphery of the disc 334, which lies next to the disc 333, and are fastened to the stator elements on the generator 319 which lie directly opposite the stator elements 321 through 326, inclusive. Thus, the feeler levers 335 through 340 extend from a position near the disc 334 down the back side of the generator 319 to stator elements, which are not shown in Fig. 3 but which would correspond to the elements 107 through 112, inclusive, of Fig. 1. As the feeler levers 327 through 332 of Fig. 3 correspond to the levers 123 through 128 of Fig. 1, the levers 335 through 340 correspond to the levers 129 through 134 and the disc 334 corresponds to the disc 201, which can be seen best in Fig. 2. The slip ring 341 and the brush 342 for the rotor of the generator 319 are also shown, as is the bracket 343 which supports the brush 342 to the bracket 311.

Since there are two sets of adjustable stator elements on each of the four generators and since a separate disc is required for each set of stator elements, eight discs are shown in Fig. 3. These comprise the discs 333, 334, 343, 344, 345, 346, 347 and 348. Furthermore, because of the fact that a cylinder, such as the cylinder 122 of Fig. 1, is associated with each disc, eight cylinders are shown in Fig. 3 and these comprise the cylinders 349 through 356, inclusive. Referring now to the discs 345, 346, 347, and 348, these discs are represented as being individually coupled to the concentric shafts 357, 358, 359 and 360, respectively. As may be seen from Fig. 3, the cylinder 356 is also coupled to the shaft 357 and the cylinders 353, 354 and 355 are coupled to the shafts 360, 359 and 358, respectively. Concentric shafts are employed to save space and to allow the cylinders 349 through 356, which serve as the means for visually indicating the signal, to be lined up in a row at the top of the chassis. The cylinders 349 through 356 have flanges, as illustrated by Fig. 3, which extend up above the top of the transmitter chassis 137 through slots cut in the chassis so that the cylinders may be more easily rotated by the operator for setting up a signal number. Each cylinder has coded identifications marked on its periphery, as may be seen by viewing the cylinders 349 through 352, so that as a cylinder is turned different identifications will appear at the top of the cylinder and will be accordingly seen by the operator as he looks down at the top of the chassis. Either the slots in the chassis may be made wide enough to allow the coded identifications on the cylinder to be viewed or the chassis may have transparent portions extending across the top of the chassis at places directly above the cylinders. These coded identifications are shown as numerals in Fig. 3 but they may be letters of the alphabet or words or any other code desired. The coded letters may be so arranged that when a particular number is seen at the topmost position of the cylinder, the disc which turns with the cylinder will be positioned to effect a movement towards the rotor of the combination of stator elements corresponding to the particular code desired. The discs 343, 344, 333 and 334 are also coupled to concentric shafts, not shown in the drawings, and are rotated when the cylinders 349, 350, 351 and 352, which are coupled to the same shafts, are turned. The shaft 165 serves as a bearing for the concentric shafts, and is itself held up by the supports 362 and 363, which are in turn attached to the transmitter chassis 137. The shaft 165 is also shown in Fig. 1.

In addition to holding the shaft 165 in position, the supports 362 and 363 hold up the stop shafts 159 and 160. These stops limit the movement of the feeler levers away from their associated discs. Similarly, the shafts 149, 150, 151 and 152 appear as the shaft 364 in Fig. 3. The shafts 150 and 151 are immovable and so are attached to the chassis; however, the shafts 149 and 150 move when the rack gears 147 and 148 move and so they cannot be attached to the chassis 137. Consequently, they are fastened to slotted supports, not shown, which permit the shafts to move in a direction perpendicular to the plane of the paper as viewed from Fig. 3. The gears 365 and 366 appear as the gear 157 of Fig. 1 and are enmeshed with the rack gears 367 and 368 and the rack gears 369 and 370, respectively. The rack gears 367 and 369 appear as the gear 147 in Fig. 1 while the gears 368 and 370 appear as the gear 148 in Fig. 1. The levers 371 and 372 seen in cross section in Fig. 3 are the same as the lever 155 shown in Fig. 1, two levers being shown to correspond with the two cradle levers supporting the receiver in Fig. 4.

Figure 4:
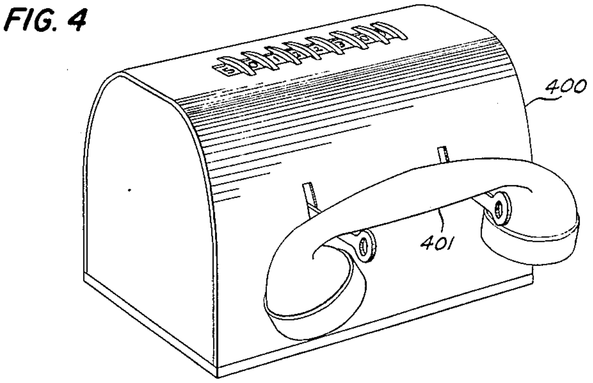
Fig. 4 shows how the transmitter might appear when used as a subscriber's set in a telephone system.

Fig. 4 shows how a subscriber's subset 400 might appear if the transmitter were used in telephone systems. In addition to the cradle levers and the receiver 401 previously mentioned, the eight cylinders which serve as the means for visually monitoring the calling signal are shown.

While certain specific embodiments of the invention have been described, it should be understood that various other embodiments of the invention may be made by those skilled in the art without departing from the spirit of the invention as defined, within the scope of the appended claims.

What is claimed is:

1. A signal transmitter comprising, a rotatable shaft, a plurality of generators coupled to said shaft, a plurality of stator elements associated with each generator, means on said stator elements for causing each generator to transmit a different frequency, means for adjusting the stator elements of each generator whereby coded impulses of current may be transmitted, and means connected to said rotatable shaft for driving said generators.

2. A signal transmitter comprising, a rotatable shaft, a plurality of generators coupled to said shaft, a plurality of adjustably positioned stator elements associated with each generator, means on said stator elements for causing each generator to transmit a different frequency, means for adjusting said stator elements of each generator whereby coded impulses of current may be transmitted, additional stator elements on each generator for effecting the transmission of start signals consisting of pulses coded differently from said aforementioned codes, and means connected to said rotatable shaft for driving said generators.

3. A signal transmitter comprising, a rotatable shaft, a plurality of generators coupled to said shaft, a plurality of adjustably positioned stator elements associated with each generator, means on said stator elements for causing each generator to transmit a different frequency, and means for adjusting said stator elements of each generator whereby coded impulses of current may be transmitted, further stator elements on each generator arranged to transmit coded impulses for identifying the particular transmitter, and means connected to said rotatable shaft for driving said generator.

4. A signal transmitter comprising, a rotatable shaft, a plurality of generators coupled to said shaft, a plurality of adjustably positioned stator elements associated with each generator, means on said stator elements for causing each generator to transmit a different frequency, means for adjusting said stator elements of each generator whereby coded impulses of current may be transmitted, additional stator elements on each generator arranged to transmit coded impulses for identifying the particular transmitter, further stator elements on each generator for effecting the transmission of start signals consisting of pulses coded differently from said aforementioned codes, and means connected to said rotatable shaft for driving said generators.

5. A signal transmitter comprising, a rotatable shaft, a plurality of generators coupled to said shaft, a plurality of adjustably positioned stator elements associated with each generator, a different number of notches on the stator elements of each generator whereby each generator is caused to transmit a different frequency, means for adjusting the position of stator elements in each generator whereby coded impulses of current may be transmitted, and means connected to said rotatable shaft for driving said generators.

6. A signal transmitter comprising, a rotatable shaft, a plurality of generators coupled to said shaft, a plurality of stator elements associated with each generator, a different number of notches on the stator elements of each generator for causing each generator to transmit a different frequency, means for adjusting the stator elements of each generator whereby coded impulses of current may be transmitted, additional stator elements on each generator arranged to transmit coded impulses for identifying the particular signal transmitter, further stator elements on each generator for effecting the transmission of start signals consisting of pulses coded differently from said aforementioned code, and means connected to said rotatable shaft for driving said generators.

7. A signaling device comprising, a rotatable shaft, a plurality of generators coupled to said shaft, a plurality of adjustable stator elements associated with each generator, means on said stator elements for causing each generator to transmit a different frequency, a plurality of discs, irregularities around the peripheries of said discs, means for rotating said discs in accordance with the code to be transmitted, means for adjusting the positions of said stator elements in accordance with the position of said irregularities on said discs, and means connected to said rotatable shaft for driving said generators.

8. A signal transmitter comprising, a rotatable shaft, a plurality of generators coupled to said shaft, a plurality of adjustable stator elements associated with each generator, a different number of notches on the stator elements of each generator for causing each generator to transmit a different frequency, a plurality of discs, irregularities in coded relation around the peripheries of said discs, means for rotating said discs in accordance with the code to be transmitted, means for adjusting the positions of said stator elements in accordance with the positions of irregularities on said discs, and means connected to said rotatable shaft for driving said generators.

9. A signal transmitter comprising, a rotatable shaft, a plurality of generators coupled to said shaft, a plurality of stator elements associated with each generator, means on said stator elements whereby each generator transmits a different frequency, a coded disc individually associated with each generator, means for rotating each of said discs into a position dependent upon the code to be transmitted, means for adjusting the positions of said stator elements in accordance with the coded information on said discs, and means connected to said rotatable shaft for driving said generators.

10. A disc having irregularities extending from its periphery in a coded arrangement, a generator having a stator and a rotor, a plurality of adjustably-positioned stator elements located around the circumference of said stator, a separate lever attached to each of said stator elements and extending to a position in proximity to the periphery of said disc, and means for displacing said levers into contact with the periphery of said disc whereby the stator elements attached to levers contacting irregularities are moved towards said rotor.

11. A disc having irregularities extending from its periphery in a coded arrangement, a generator having a stator and a rotor, a plurality of adjustably-positioned stator elements located around the circumference of said stator, a plurality of levers attached to said stator elements and extending to positions in proximity to the periphery of said disc, a cylindrical gear, a rack gear having teeth enmeshing the teeth of said gear, and means for rotating said cylindrical gear whereby said levers are displaced by said rack gear into contact with the periphery of said disc and thereby the stator elements attached to levers touching irregularities on said disc are moved towards the rotor of said generator.

12. A disc, a generator for converting coded information, a number of equal arcs arranged to overlap each other around the periphery of the disc, and a plurality of irregularities arranged in a distinctive pattern for each overlapped arc whereby the coded information transmitted by said generator is determined by the rotational position of said irregularities.

WARREN A. MARRISON.

REFERENCES CITED

The following references are of record in the file of this patent:

UNITED STATES PATENTS

| Number | Name | Date |
|---|---|---|
| 2,204,759 | Hubbard | June 18, 1940 |
| 2,206,538 | Rhodes | July 2, 1940 |
| 2,279,232 | Graham | Apr. 7, 1942 |
| 2,303,918 | Dimond | Dec. 1, 1942 |
| 2,307,965 | Shepherd | Jan. 12, 1943 |
| 2,388,313 | Dowey | Nov. 6, 1945 |
| 2,418,836 | Hawes | Apr. 15, 1947 |